(12) United States Patent
Smith

(10) Patent No.: US 6,761,129 B1
(45) Date of Patent: Jul. 13, 2004

(54) ANIMAL FEEDER

(76) Inventor: David A. Smith, P.O. Box 3059, Newton, NJ (US) 07860

( * ) Notice: Subject to any disclaimer, the term of this patent is extended or adjusted under 35 U.S.C. 154(b) by 0 days.

(21) Appl. No.: 10/661,124

(22) Filed: Sep. 15, 2003

(51) Int. Cl.[7] ............................................. A01K 61/02
(52) U.S. Cl. ..................................................... 119/52.1
(58) Field of Search ............................ 119/51.01, 52.1, 119/52.4, 449, 515, 521; 248/218.4, 219.1, 219.2, 227.3

(56) References Cited

U.S. PATENT DOCUMENTS

| | | | | |
|---|---|---|---|---|
| 1,005,071 | A | * 10/1911 | Randall | 119/52.1 |
| 1,079,231 | A | * 11/1913 | Franklin | 119/52.1 |
| 1,225,645 | A | * 5/1917 | Kennedy | 119/52.1 |
| 1,274,375 | A | * 8/1918 | Blows | 119/52.1 |
| 2,701,549 | A | * 2/1955 | Jones | 119/52.4 |
| 4,945,859 | A | 8/1990 | Churchwell | |
| 5,333,572 | A | 8/1994 | Nutt | |
| 5,794,563 | A | 8/1998 | Klepac | |
| D405,560 | S | 2/1999 | Chrisco | |
| 6,082,300 | A | 7/2000 | Futch | |
| 6,363,887 | B1 | 4/2002 | Davis | |
| 6,481,374 | B1 | * 11/2002 | Lillig | 119/52.1 |

FOREIGN PATENT DOCUMENTS

FR          2561067     * 9/1985

* cited by examiner

Primary Examiner—Charles T. Jordan
Assistant Examiner—T. Nguyen

(57) ABSTRACT

An animal feeder includes a housing including a bottom wall and a peripheral wall. A cover is removably positionable over an opening defined by an upper edge of the peripheral wall for selectively opening or closing the housing. Each of a pair of mounts is positioned on the peripheral wall. A funnel is positioned in the housing and includes a spout extending outwardly through the bottom wall. A plate has an upper side that has a central area having a raised portion thereon. Each of a plurality of rods has a first end attached to the bottom wall and a second end attached to the plate such that the spout is vertically aligned with the raised portion. A limb mounting assembly includes a pair of male couplers for attaching to the mounts and a tether for selectively hanging the housing.

6 Claims, 4 Drawing Sheets

US 6,761,129 B1

ANIMAL FEEDER

BACKGROUND OF THE INVENTION

1. Field of the Invention

The present invention relates to animal feeding devices and more particularly pertains to a new animal feeding device for effectively holding and distributing animal feed.

2. Description of the Prior Art

The use of animal feeding devices is known in the prior art. While these devices fulfill their respective, particular objectives and requirements, the need remains for a device that holds animal feed and dispenses it in such a manner as make it easily accessible by large animals such as deer while retaining the remaining feed within a housing to protect it from the elements. Such a device should also have multiple mounting variations.

SUMMARY OF THE INVENTION

The present invention meets the needs presented above by including a plate onto which the feed is dispensed for spreading out the feed so that it is easily accessible to deer and other animals.

Another object of the present invention is to provide a new animal feeding device that includes mountings for mounting the device on a limb or on a post.

To this end, the present invention generally comprises a housing including a bottom wall and a peripheral wall that is attached to and extends upwardly from the bottom wall. The peripheral wall has an upper edge defining an opening into an interior of the housing. A cover is removably positionable over the opening for selectively opening or closing the housing. Each of a pair of mounts is positioned on the peripheral wall. A funnel is positioned in the housing and includes a spout extending outwardly through the bottom wall. The funnel has an upper perimeter is abutted against and extending along an inner surface of the peripheral wall. A plate has an upper side that has a central area having a raised portion thereon. Each of a plurality of rods has a first end attached to the bottom wall and a second end attached to the plate such that the spout is vertically aligned with the raised portion. A limb mounting assembly includes a pair of male couplers and a tether. Each of the male couplers is selectively coupled with one of the mounts and the tether is attached to the male couplers for selectively hanging the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
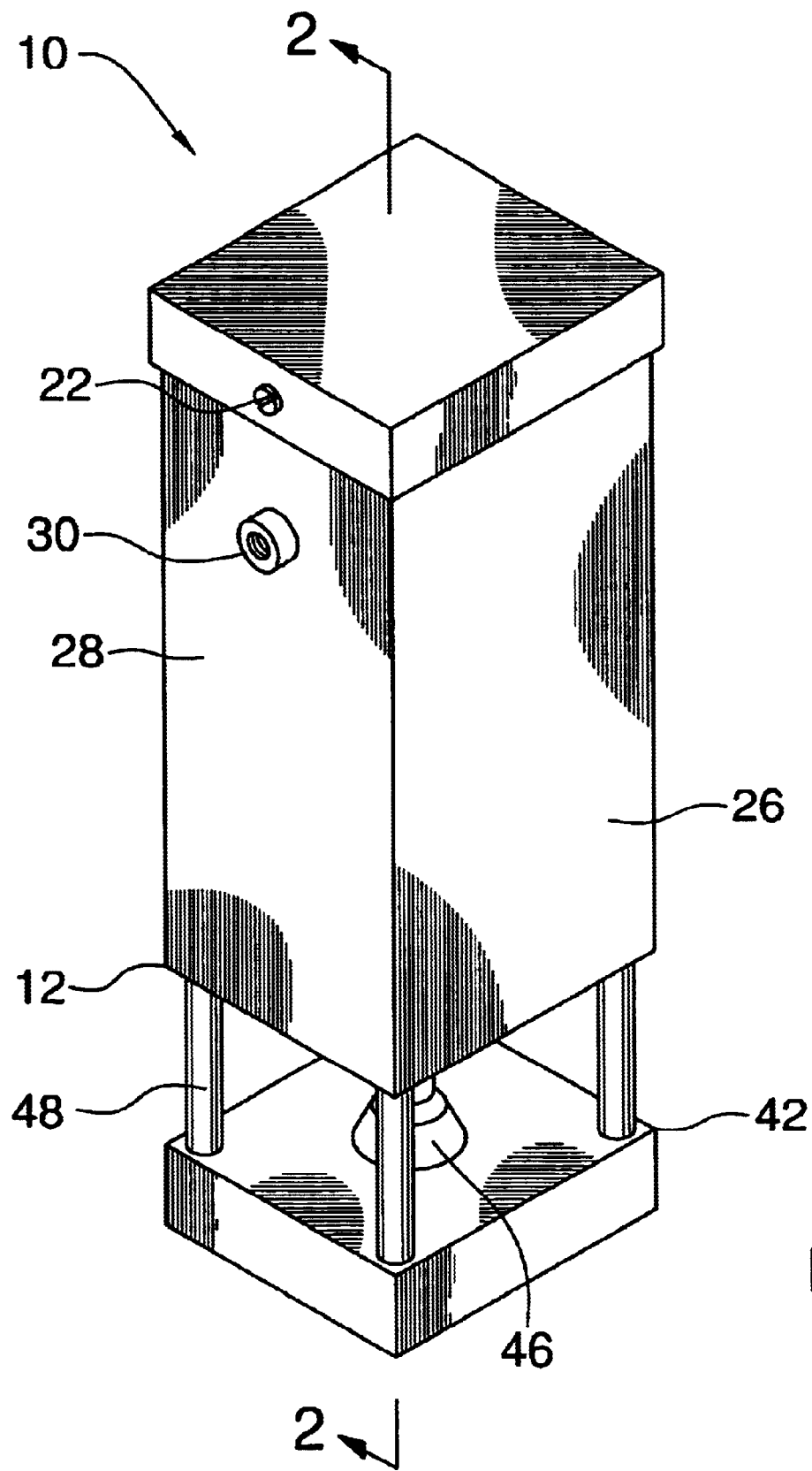
FIG. 1 is a schematic perspective view of an animal feeder according to the present invention.
Figure 2:
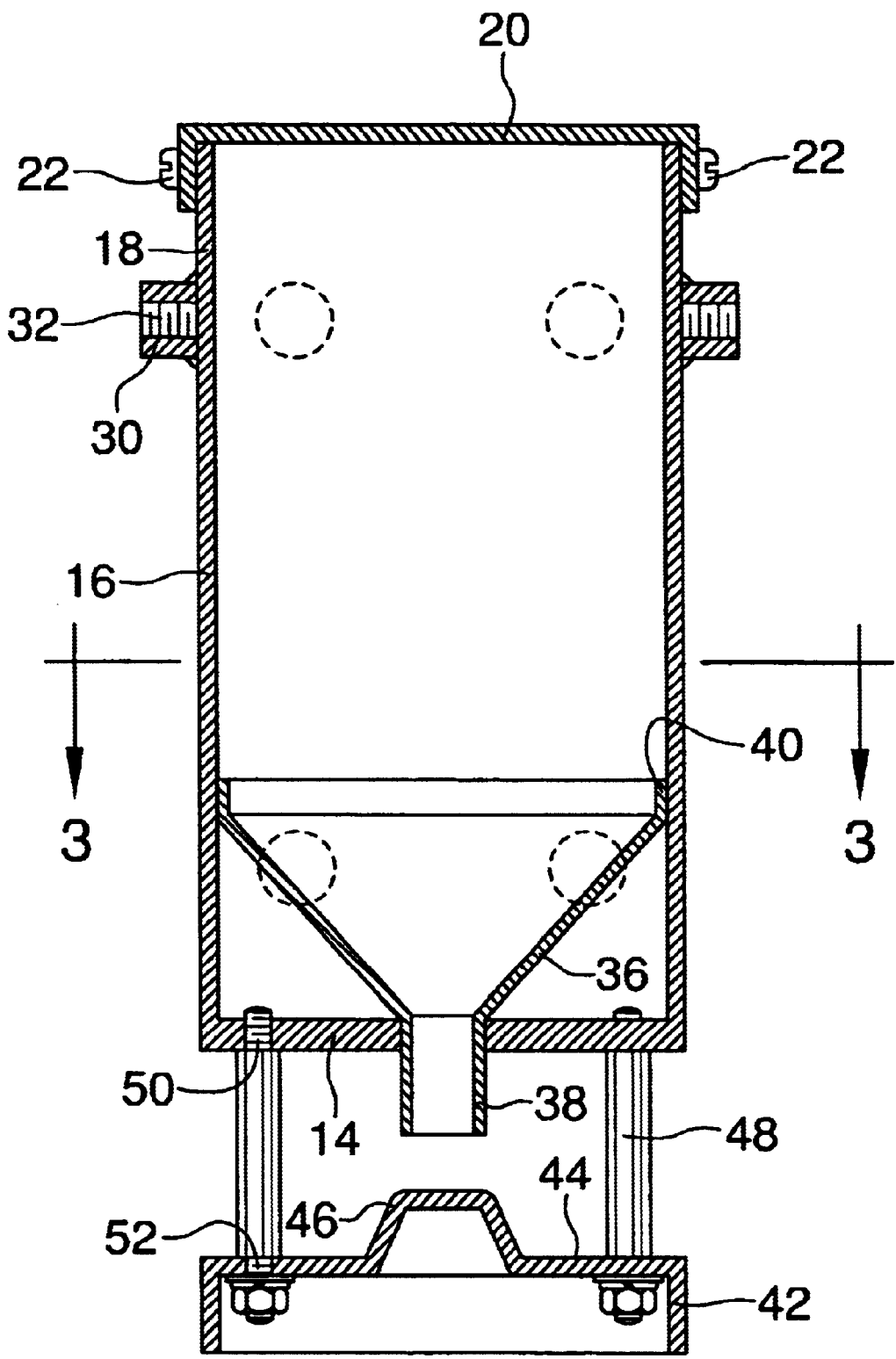
FIG. 2 is a schematic cross-sectional view of the present invention.
Figure 3:
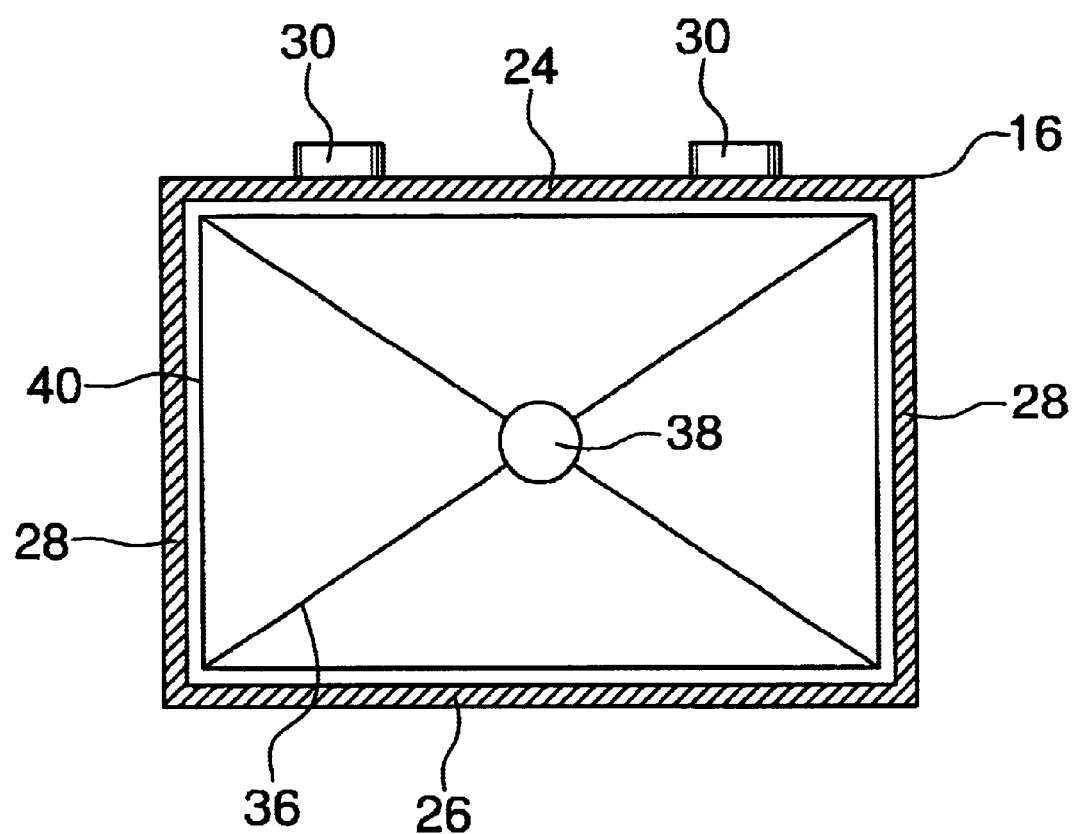
FIG. 3 is a schematic cross-sectional view taken along line 3—3 of FIG. 2 of the present invention.
Figure 4:
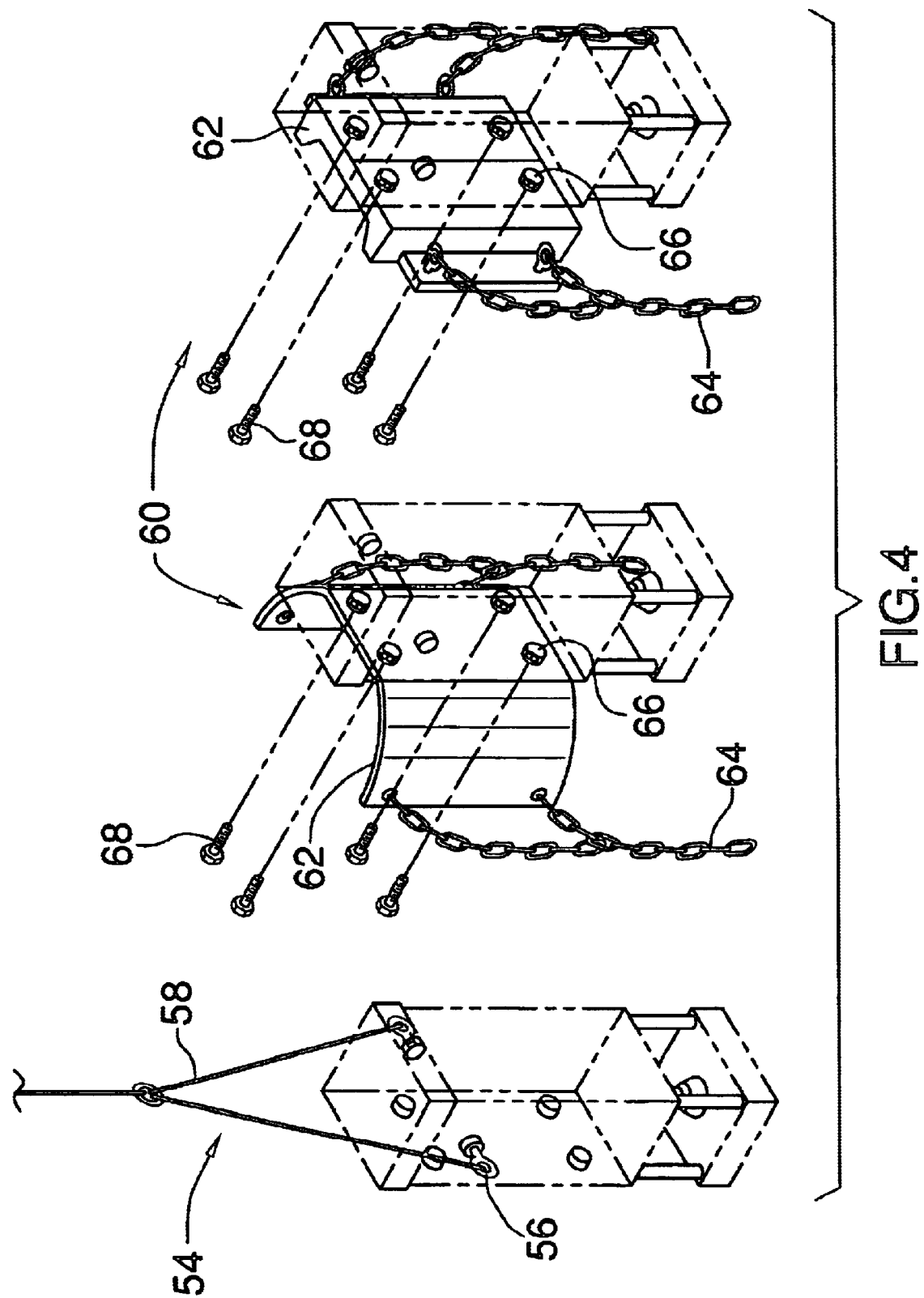
FIG. 4 is a schematic perspective view of mounting variations of the present invention.

With reference now to the drawings, and in particular to FIGS. 1 through 4 thereof, a new animal feeding device embodying the principles and concepts of the present invention and generally designated by the reference numeral 10 will be described.

As best illustrated in FIGS. 1 through 4, the animal feeder 10 generally comprises a housing 12 including a bottom wall 14 and a peripheral wall 16 that is attached to and extends upwardly from the bottom wall 14. The peripheral wall 16 has an upper edge 18 defining an opening into an interior of the housing 12. A cover 20 is removably positionable over the opening for selectively opening or closing the housing 12. At least one securing member 22 selectively secures the cover to the housing 12 in a closed position. The securing member 22 preferably includes one or more screws or bolts extending through a lip of the cover 20. The bottom wall 14 has a generally rectangular shape. The peripheral wall 16 includes a rear wall 24, a front wall 26, and a pair of side walls 28. Each of a pair of mounts 30 is positioned on one of the side walls 28. Each of the mounts 30 has a threaded well 32 extending therein. A plurality of mounts 30 is also attached to and extends outwardly from the rear wall 24.

A funnel 36 is preferably positioned in the housing 12 and includes a spout 38 extending outwardly through the bottom wall 14. The funnel 36 has an upper perimeter 40 that is abutted against and extends along an inner surface of the peripheral wall 16. The funnel 36 ensures that all grain or seeds positioned within the housing 12 exits the housing 12 through the spout 38.

A plate 42 has an upper side 44 that has a central area having a raised portion 46. The raised portion 46 has a frusto-conical shape. The plate 42 has generally the same size and shape as the bottom wall 14. Each of a plurality of rods 48 has a first end 50 attached to the bottom wall 14 and a second end 52 attached to the plate 42 such that the spout 38 is vertically aligned with the raised portion 46. When the contents of the housing 12 are deposited outwardly through the spout 38, the raised portion 46 spreads out the contents for easy feeding adjacent to edges of the plate 42.

A limb mounting assembly 54 for mounting the housing from a tree limb includes a pair of male couplers 56 and a tether 58. Each of the male couplers 56 is selectively coupled with one of the mounts 30. The tether 58 is attached to the male couplers 56 for selectively hanging the housing 12. The animal feeder 10 also preferably includes a post mounting assembly 60 for mounting the housing 12 on a vertical post or on a tree trunk. The post mounting assembly 60 includes a panel 62 and a fastening member 64. The panel 62 has a plurality of apertures 66 extending therethrough. Each of the apertures 66 is positioned for receiving one of the mounts 30 on the rear wall 24. Screws 68, or other securing members are extendable through the apertures 66 and into the mounts 30 on the rear wall 24 to secure the panel 62 to the housing 12. The fastening member 64 is attached to the panel 62 for selectively extending around a post, tree trunk or other vertical member. The fastening member 64 preferably includes a pair of chains to be secured around the vertical member though straps may also be utilized. The panel 62 may have a rounded shape for easy positioning around a tree trunk.

In use, the housing is filled with the type of feed as depending on the type of animal to be fed. The housing is either mounted to a vertical post or post-like structure, or it is hung from a limb. The feed is dispensed through spout and is spread outwardly on the plate. The food builds upwardly to the spout so that it stops dispensing outwardly from the housing. For this reason, it is important the distance from the raised portion to the spout is less than two inches and preferable no greater than one inch. As an animal eats the food from the plate, additional food is dispensed onto the plate.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An animal feeding device comprising:
   a housing including a bottom wall and a peripheral wall being attached to and extending upwardly from said bottom wall, said peripheral wall having an upper edge defining an opening into an interior of said housing, a cover being removably positionable over said opening for selectively opening or closing said housing;
   a pair of mounts, each of said mounts being positioned on said peripheral wall;
   a funnel being positioned in said housing and including a spout extending outwardly through said bottom wall, said funnel having an upper perimeter being abutted against and extending along an inner surface of said peripheral wall;
   a plate having an upper side, said upper side having a central area having a raised portion thereon;
   a plurality of rods each having a first end attached to said bottom wall and a second end attached to said plate such that said spout is vertically aligned with said raised portion; and
   a limb mounting assembly including a pair of male couplers and a tether, each of said male couplers being selectively coupled with one of said mounts, said tether being attached to said male couplers for selectively hanging said housing.

2. The animal feeding device of claim 1, wherein said bottom wall has a generally rectangular shape, said peripheral wall including a rear wall, a front wall, and a pair of side walls, each of said mounts being positioned on one of said side walls, each of said mounts having a threaded well extending therein.

3. The animal feeding device of claim 2, further including a plurality of mounts being attached to said rear wall, a post mounting assembly including a panel having a plurality of apertures extending therethrough and a fastening member, each of said apertures being alignable with one of said mounts on said rear wall, a plurality of securing members being selectively extendable through said apertures and into said mounts on said rear wall, said fastening member being attached to said panel for selectively extending around a vertical member.

4. The animal feeding device of claim 1, wherein said raised portion has a frusto-conical shape.

5. The animal feeding device of claim 4, wherein said plate has generally the same size and shape as said bottom wall.

6. An animal feeding device comprising:
   a housing including a bottom wall and a peripheral wall being attached to and extending upwardly from said bottom wall, said peripheral wall having an upper edge defining an opening into an interior of said housing, a cover being removably positionable over said opening for selectively opening or closing said housing, at least one securing member selectively secures said cover to said housing in a closed position, said bottom wall having a generally rectangular shape, said peripheral wall including a rear wall, a front wall, and a pair of side walls;
   a pair of mounts, each of said mounts being positioned on one of said side walls, each of said mounts having a threaded well extending therein, a plurality of mounts being positioned on said rear wall;
   a funnel being positioned in said housing and including a spout extending outwardly through said bottom wall, said funnel having an upper perimeter being abutted against and extending along an inner surface of said peripheral wall;
   a plate having an upper side, said upper side having a central area having a raised portion thereon, said raised portion having a frusto-conical shape, said plate having generally the same size and shape as said bottom wall;
   a plurality of rods each having a first end attached to said bottom wall and a second end attached to said plate such that said spout is vertically aligned with said raised portion;
   a limb mounting assembly including a pair of male couplers and a tether, each of said male couplers being selectively coupled with one of said mounts, said tether being attached to said male couplers for selectively hanging said housing; and
   a post mounting assembly including a panel and a fastening member, said panel having a plurality of apertures extending therethrough, each of said apertures being alignable with one of said mounts on said rear wall, a plurality of securing members being selectively extendable through said apertures and into said mounts on said rear wall, said fastening member being attached to said panel for selectively extending around a vertical member.

* * * * *